Nov. 2, 1948.　　　　N. BELL　　　　2,452,828

BORING HEAD

Original Filed Dec. 18, 1942

INVENTOR.
NICHOLAS BELL
BY Thos Donnelly
His attorney

Patented Nov. 2, 1948

2,452,828

UNITED STATES PATENT OFFICE 2,452,828

BORING HEAD

Nicholas Bell, Dearborn, Mich.

Original application December 18, 1942, Serial No. 469,743. Divided and this application October 22, 1945, Serial No. 623,617

1 Claim. (Cl. 77—58)

This application constitutes a division of my co-pending application, Serial No. 469,743, filed December 18, 1942, for a patent on a Boring head, on which application Patent No. 2,398,491 issued August 16, 1946.

The present invention relates to a new and useful improvement in a boring head adapted for use on boring machines and the like. It is an object of the present invention to provide a boring head having a supporting shank and provided with attaching means whereby a tool-carrying part may be mounted thereon capable of radial movement and provided with means for locking the same in its various positions of radial movement.

Another object of the invention is the provision of a boring head having a supporting shank slitted on one end and adapted to clamp, by the slitted portions, a tool retainer and its cooperating parts so that the tool holder mounted on the retainer may be easily and quickly moved radially.

Other objects will appear hereinafter.

It is recognized that various modifications and changes may be made in the detail of structure illustrated and it is intended that such shall be embraced within the scope of the claim which forms a part thereof.

Forming a part of this application are drawings in which.

Figure 1:
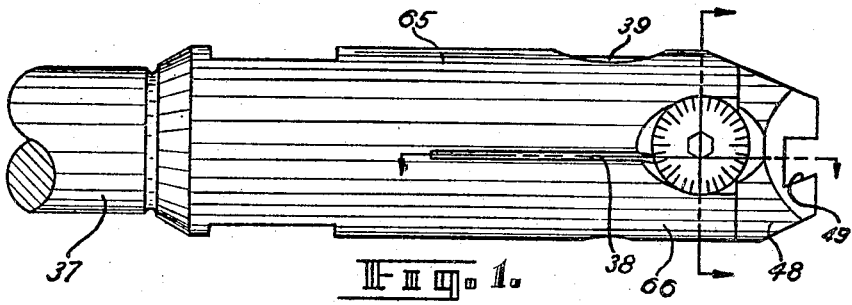
Fig. 1 is an elevational view of the invention.
Figure 2:
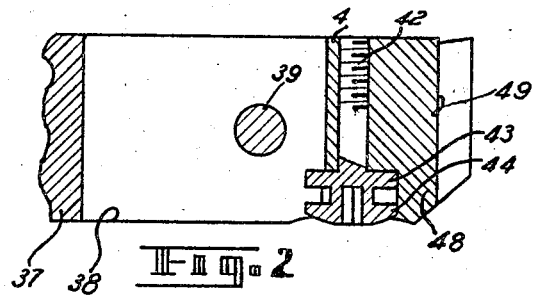
Fig. 2 is a fragmentary sectional view taken on line 2—2 of Fig. 1.
Figure 3:
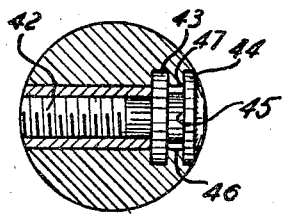
Fig. 3 is a sectional view taken on line 3—3 of Fig. 1.
Figure 4:
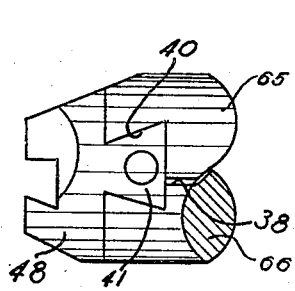
Fig. 4 is a fragmentary elevational view of the invention of a side different from that shown in Fig. 1.
Figure 5:
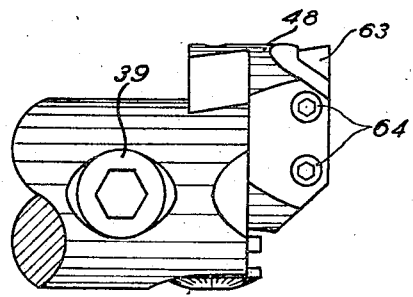
Fig. 5 is a fragmentary side elevational view of the invention from another direction.

I have illustrated the invention used on a structure embodying a shank 37 which is adapted to be rotated by a rotating mechanism. As shown in Fig. 1 the end portion of the shank 37 is enlarged and slitted inwardly as at 38 from one end to provide the pair of sections 65 and 66. A bolt 39 is projected from one of the split portions and threaded into the other, whereby these parts may be moved into approach for suitable clamping purposes. In this structure I provide a tool retainer 48 having the tool-receiving slot 49 formed therein, in which a suitable tool 63 may be clamped by means of the set screw 64. This tool retainer 48 is provided with the rearwardly extending dove-tailed rib 41 slidably engaging in the dove-tailed slot 40 formed in the opposed faces of the sections 65 and 66 of the shank 37, at one end of these sections 65 and 66. A stud 42 is threaded into a threaded passage formed in the rib 41 for radially moving the retainer relatively to the shank 37. This stud is provided with a head having the portions 43 and 44 spaced-apart and lying on opposite side of the flanges 46 and 47 of the portions 65 and 66. These flanges 46 and 47 conform to the curvature of the part of the stud lying therebetween. In order to mount the stud in position the screw 39 would be backed out and the parts 65 and 66 spread apart sufficiently for allowing the sliding of the screw inwardly into position from the end of the portions 65 and 66. The screw 39 would then serve as a means for clamping the parts close together so as to prevent removal of the stud.

It is believed obvious that upon a rotating of the stud 42 the retainer 48 may be moved radially of the shank 37 and thus the adjustment of the tool radially of the shank 37 effected. In this way the tool may be moved radially to various positions of adjustment so that there is thus afforded a means for accurate adjustment of the cutting tool to various diameters of cut.

It is believed obvious the device is constructed of parts which may be easily removed and replaced when the same become worn out and in this manner I have provided a suitable and inexpensive structure which may be easily and quickly adjusted to its various positions while at the same time the structure is one which is quite durable.

What I claim as new:

A tool of the class described, comprising an elongated supporting head having a diametrically directed groove formed in its front face and communicating with a longitudinally directed slit extending axially inwardly therefrom for separating the forward part of said head into a pair of separable parts; a cutting tool retainer; a diametrically extending rib on the rear face of said retainer engageable in said groove for radial momevement relatively to said head and having an internally threaded passage extending longitudinally therethrough, said retainer having on its forward face a tool receiving slot extending parallel to said rib; a stud threaded into said passage; a head on said stud engaging in a recess formed in said separable parts and provided with a peripheral groove; and flange members on each of said separable parts for engaging in said peripheral groove and retaining said screw in fixed radial relation to said supporting head; and means extending through said separable parts for clamping the same together.

NICHOLAS BELL.

REFERENCES CITED

The following references are of record in the file of this patent:

UNITED STATES PATENTS

| Number | Name | Date |
|---|---|---|
| 1,485,937 | Raab | March 4, 1924 |
| 2,302,869 | Jewell | Nov. 24, 1942 |
| 2,398,491 | Bell | April 10, 1946 |